United States Patent
Shah

(10) Patent No.: US 9,116,654 B1
(45) Date of Patent: Aug. 25, 2015

(54) CONTROLLING THE RENDERING OF SUPPLEMENTAL CONTENT RELATED TO ELECTRONIC BOOKS

(75) Inventor: Mehal H. Shah, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 202 days.

(21) Appl. No.: 13/308,825

(22) Filed: Dec. 1, 2011

(51) Int. Cl.
*G06F 17/27* (2006.01)
*G06F 3/14* (2006.01)
*G06F 17/28* (2006.01)

(52) U.S. Cl.
CPC .......................................... *G06F 3/14* (2013.01)

(58) Field of Classification Search
USPC ........................................................ 715/230
See application file for complete search history.

(56) References Cited

U.S. PATENT DOCUMENTS

| | | | |
|---|---|---|---|
| 4,456,973 A | 6/1984 | Carlgren et al. | |
| 4,764,976 A | 8/1988 | Kallin et al. | |
| 5,146,552 A * | 9/1992 | Cassorla et al. | 715/234 |
| 5,359,514 A | 10/1994 | Manthuruthil et al. | |
| 5,486,111 A | 1/1996 | Watkins | |
| 5,649,826 A | 7/1997 | West et al. | |
| 5,957,693 A | 9/1999 | Panec | |
| 6,370,498 B1 | 4/2002 | Flores et al. | |
| 6,438,515 B1 | 8/2002 | Crawford et al. | |
| 6,683,611 B1 | 1/2004 | Cleveland | |
| 6,816,830 B1 | 11/2004 | Kempe | |
| 6,953,343 B2 | 10/2005 | Townshend | |
| 7,136,877 B2 | 11/2006 | Volcani et al. | |
| 7,270,546 B1 | 9/2007 | Adams, Jr. et al. | |
| 7,313,513 B2 | 12/2007 | Kinder | |
| 7,386,453 B2 | 6/2008 | Polanyi et al. | |
| 7,483,871 B2 | 1/2009 | Herz | |
| 7,801,721 B2 | 9/2010 | Rosart et al. | |
| 7,801,896 B2 | 9/2010 | Szabo | |
| 7,818,164 B2 | 10/2010 | Wood et al. | |
| 7,905,391 B1 | 3/2011 | Shilling | |
| 7,912,717 B1 | 3/2011 | Galick | |
| 7,974,714 B2 | 7/2011 | Hoffberg | |
| 8,171,032 B2 | 5/2012 | Herz | |
| 8,478,662 B1 * | 7/2013 | Snodgrass et al. | 705/26.7 |

(Continued)

OTHER PUBLICATIONS

Graham et al., "Visual Search Applications for Connecting Published Works to Digital Material", ACM, 2010, pp. 1525-1526.*

(Continued)

*Primary Examiner* — James J Debrow
(74) *Attorney, Agent, or Firm* — Lee & Hayes, PLLC

(57) ABSTRACT

Architectures and techniques are provided to control the rendering of supplemental content associated with electronic books. For example, electronic books may be associated with content that is in addition to the content originally provided to an individual acquiring the electronic book, such as annotations, social networking site information, media outlet information, and the like. Individuals may control the supplemental electronic book content that is rendered via their client devices via actuation of a physical input device or a representation of an input device shown via a touch sensitive display. The amount of supplemental content that is rendered may correspond to information associated with a specified number of categories of supplemental electronic book content based on a supplemental content rendering level. In other implementations, the amount of supplemental electronic book content that is rendered may correspond to an amount of supplemental content to be rendered for each category of supplemental content.

27 Claims, 9 Drawing Sheets

(56) References Cited

U.S. PATENT DOCUMENTS

| | | | |
|---|---|---|---|
| 2002/0120635 A1* | 8/2002 | Joao | 707/200 |
| 2002/0182578 A1 | 12/2002 | Rachman et al. | |
| 2002/0199166 A1 | 12/2002 | Volcani et al. | |
| 2003/0068603 A1 | 4/2003 | Cupp | |
| 2003/0093275 A1 | 5/2003 | Polanyi et al. | |
| 2003/0152894 A1 | 8/2003 | Townshend | |
| 2004/0067472 A1 | 4/2004 | Polanyi et al. | |
| 2004/0117728 A1 | 6/2004 | Gromer | |
| 2004/0253568 A1 | 12/2004 | Shaver-Troup | |
| 2005/0027664 A1* | 2/2005 | Johnson et al. | 706/12 |
| 2005/0039121 A1 | 2/2005 | Cleveland | |
| 2005/0131762 A1 | 6/2005 | Bharat et al. | |
| 2005/0193335 A1* | 9/2005 | Dorai et al. | 715/530 |
| 2007/0011005 A1 | 1/2007 | Morrison et al. | |
| 2007/0067294 A1 | 3/2007 | Ward et al. | |
| 2007/0292826 A1 | 12/2007 | Goddy et al. | |
| 2008/0070205 A1 | 3/2008 | Amick et al. | |
| 2008/0140412 A1 | 6/2008 | Millman et al. | |
| 2008/0141117 A1* | 6/2008 | King et al. | 715/238 |
| 2008/0229190 A1* | 9/2008 | Johnson | 715/238 |
| 2009/0092952 A1 | 4/2009 | Schlanger et al. | |
| 2009/0246744 A1 | 10/2009 | Lofthus et al. | |
| 2009/0263778 A1 | 10/2009 | Berger et al. | |
| 2010/0105016 A1 | 4/2010 | Margolis | |
| 2010/0153889 A1 | 6/2010 | Krause | |
| 2010/0299205 A1* | 11/2010 | Erdmann et al. | 705/14.54 |
| 2011/0175805 A1* | 7/2011 | Rottler et al. | 345/156 |
| 2011/0261030 A1* | 10/2011 | Bullock | 345/204 |
| 2011/0306023 A1 | 12/2011 | Blank et al. | |
| 2011/0313756 A1 | 12/2011 | Connor | |
| 2012/0030587 A1* | 2/2012 | Ketkar | 715/751 |
| 2012/0047455 A1* | 2/2012 | Yuan et al. | 715/781 |
| 2012/0077155 A1 | 3/2012 | Siani | |
| 2012/0088211 A1 | 4/2012 | Massaro | |
| 2012/0173659 A1* | 7/2012 | Thaxter et al. | 709/217 |
| 2012/0233539 A1* | 9/2012 | Reed | 715/234 |
| 2012/0293529 A1 | 11/2012 | Che et al. | |
| 2013/0073675 A1* | 3/2013 | Hwang et al. | 709/217 |
| 2013/0080881 A1* | 3/2013 | Goodspeed et al. | 715/251 |
| 2013/0097164 A1* | 4/2013 | Welinder et al. | 707/736 |
| 2014/0019553 A1* | 1/2014 | Bill | 709/204 |

OTHER PUBLICATIONS

Office action for U.S. Appl. No. 12/853,038, mailed on Dec. 21, 2012, Rausch, "Providing Electronic Books According to Reading Capability", 15 pages.

Office action for U.S. Appl. No. 12/853,076, mailed on Mar. 14, 2013, Rausch, "Determining Reading Levels of Electronic Books", 13 pages.

Final Office Action for U.S. Appl. No. 12/853,038, mailed on May 22, 2013, Rausch, "Providing Electronic Books According to Reading Capability", 19 pages.

Final Office action for U.S. Appl. No. 12/165,049 mailed on Aug. 28, 2012, Lattyak, "Providing Progressive Language Conversion for Digital Content on an Electronic Device", 21 pages.

Final Office Action for U.S. Appl. No. 12/165,049, mailed on Sep. 1, 2011, John Lattyak, "Providing Progressive Language Conversion for Digital Content on an Electronic Device," 14 pages.

U.S. Appl. No. 12/165,049, filed Jun. 30, 2008, Lattyak, et al., "Providing Progressive Language Conversion for Digital Content on an Electronic Device".

U.S. Appl. No. 12/853,038, filed Aug. 9, 2010, Daniel B. Rausch, "Providing Electronic Books According to Reading Capability".

Non-Final Office Action for U.S. Appl. No. 12/165,049, mailed on May 1, 2012, John Lattyak, "Providing Progressive Language Conversion for Digital Content on an Electronic Device" 15 pages.

Office Action for U.S. Appl. No. 13/345,452, mailed on Nov. 4, 2013, Rainer V. Mager, "Selective Display of Pronunciation Guides in Electronic Books", 25 pages.

Office action for U.S. Appl. No. 12/853,076, mailed on Aug. 22, 2013, Rausch, "Determining Reading Levels of Electronic Books", 10 pages.

Office action for U.S. Appl. No. 12/165,049, mailed on Aug. 23, 2013, Lattyak, "Providing Progressive Language Conversion for Digital Content on an Electronic Device ", 16 pages.

Wikipedia, "Computer File", retrieved on Aug. 16, 2013, at http://web.archive.org/web/20060915135156/http://en.wikipedia.org/wiki/File_%28computer%29, Wikimedia Foundation, Inc., 2006, 3 pages.

Final Office Action for U.S. Appl. No. 13/345,452, mailed on Apr. 17, 2014, Rainer V. Mager, "Selective Display of Pronunciation Guides in Electronic Books", 24 pages.

Office action for U.S. Appl. No. 12/853,038, mailed on Sep. 18, 2014, Rausch, "Providing Electronic Books According to Reading Capability", 21 pages.

Final Office Action for U.S. Appl. No. 12/853,038, mailed on Mar. 11, 2015, Daniel B. Rausch, "Providing Electronic Books According to Reading Capability", 22 pages.

\* cited by examiner

The Tragedy of Macbeth
William Shakespeare

SCENE I. A cavern. In the middle, a boiling cauldron.

*Thunder. Enter the three Witches*

First Witch
Thrice the brinded cat hath mew'd.

Second Witch
Thrice and once the hedge-pig whined.

Third Witch
Harpier cries 'Tis time, 'tis time.

First Witch
Round about the cauldron go;
In the poison'd entrails throw.
Toad, that under cold stone
Days and nights has thirty-one
Swelter'd venom sleeping got,
Boil thou first i' the charmed pot.

ALL
Double, double toil and trouble;
Fire burn, and cauldron bubble

---

Annotations

ABC: William Shakespeare likely wrote this between 1603 and 1607...

123: Professor Smith indicated that this was an important passage...

JKL: The contents of the witches brew is the subject of some debate...

Social Network Activity

Friend A: I just finished reading Act 1 Scene 3 and was wondering...

Friend of Friend A: Also finished reading that and had similar idea...

Friend B: Just realized that in the movie this scene seems different...

In the News

Daily Paper: See Macbeth on Saturday at the theater on 1st Ave...

National Source: Shakespearean scholars appear to have found ...

Other Source: For a limited time, the William Shakespeare Museum...

FIG. 3

CONTROLLING THE RENDERING OF SUPPLEMENTAL CONTENT RELATED TO ELECTRONIC BOOKS

BACKGROUND

Increasingly, individuals are reading electronic versions of books, also referred to in some cases as "eBooks" or "electronic books," via their client devices, such as electronic reader devices, smart phones, tablet computers, and the like. Supplemental content associated with electronic books is also becoming more prevalent. For example, individuals may post comments about electronic books they are reading to social networking sites and/or micro-blogging sites. Further, individuals may provide annotations associated with electronic books as they are reading the electronic books. In some cases, the annotations may be collected by one or more service providers or publishers and made available to certain individuals reading an electronic book. In addition, information about electronic books and authors of electronic books may be available via a number of sites, such as media outlet sites, blogging sites, and so forth. However, it can be inefficient and time consuming to aggregate supplemental content associated with electronic books from a number of sources. Additionally, individuals may not even be aware of all of the supplemental content that is available for an electronic book. Further, client devices generally provide limited mechanisms for controlling the rendering of supplemental content while reading an electronic book.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates a user interface including supplemental electronic book content according to a first level of supplemental content rendering.

DETAILED DESCRIPTION

Figure 1:
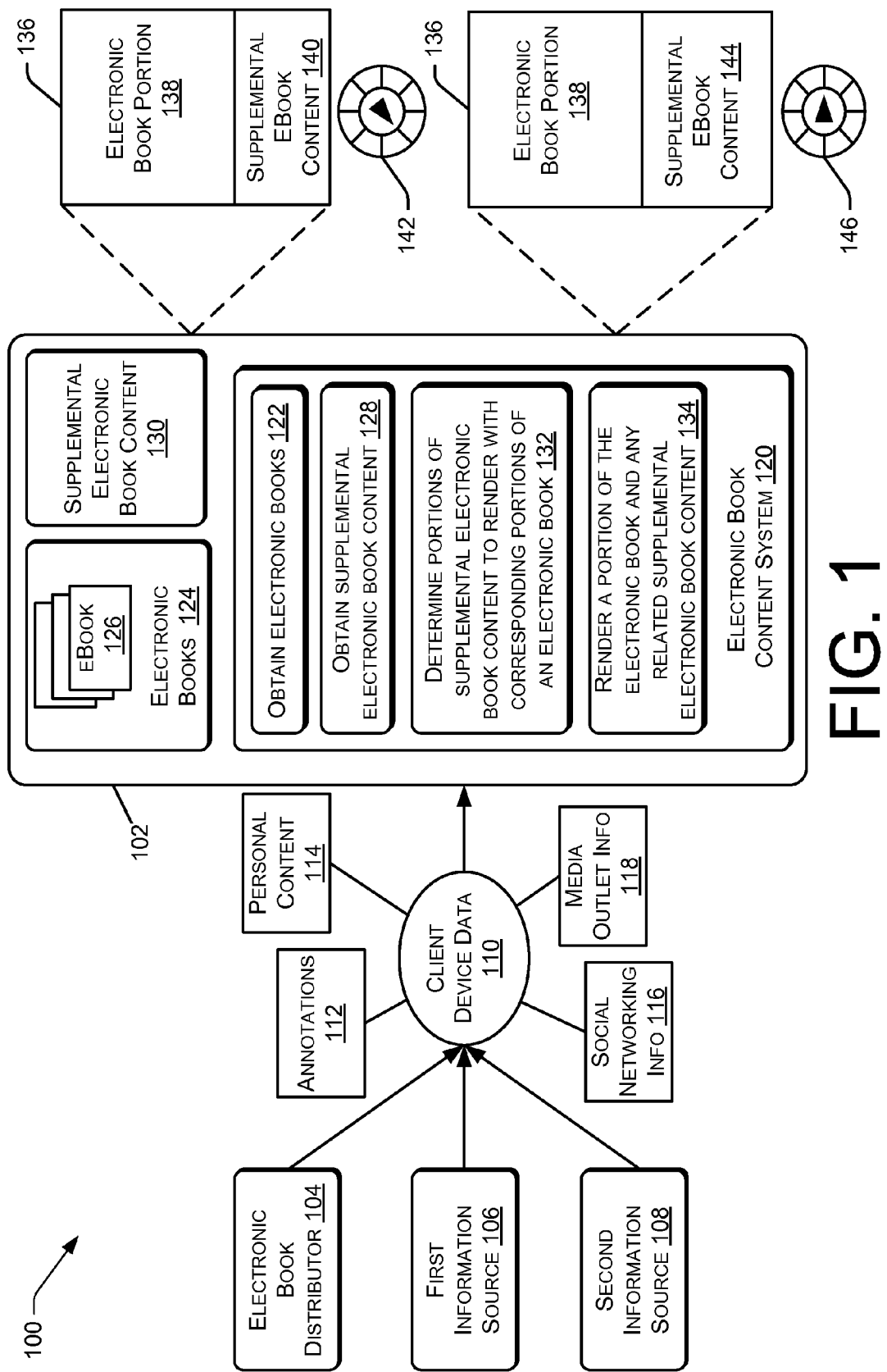
FIG. 1 illustrates an architecture to render supplemental electronic book content according to input received from a user of a client device.

This disclosure describes architectures and techniques to control the rendering of supplemental content associated with electronic books. In particular, electronic books may be provided to client devices of individuals via an electronic book distributor or another service provider. The electronic books may include one or more forms of content, such as text content, image content, video content, audio content, or combinations thereof. The content of electronic books may be provided by one or more authors of the electronic book, one or more editors of the electronic book, one or more publishers of the electronic book, or combinations thereof. When an individual acquires an electronic book, the content of the electronic book may be sent to the client device of the individual by the electronic book distributor.

In some cases, electronic books may be associated with content that is in addition to the content originally provided to an individual acquiring the electronic book. For example, individuals may provide annotations corresponding to electronic books. The individuals providing the annotations may include one or more authors of the electronic book, people that are reading or that have read the electronic book, professors, students, combinations thereof, and the like. In certain situations, the annotations may be collected by a service provider and provided to one or more individuals that acquired the electronic book.

In another example, social network activity may be generated about particular electronic books. To illustrate, individuals may post comments about electronic books that they are reading on a social networking site. Additionally, micro-blogging sites and/or blogs may include comments about electronic books. Further, media outlet sites that provide news pieces, articles, commentaries, combinations thereof, and so forth, may distribute information that is related to electronic books.

In certain implementations, a service provider may aggregate supplemental content associated with electronic books and provide the supplemental content to individuals that have acquired the electronic books. For example, the service provider may aggregate annotations, social network activity, media outlet information, and the like, and provide the supplemental content to certain individuals. In some cases, the individuals may have requested to receive the supplemental content from the service provider. Further, the individuals may have provided some value to the service provider to receive the supplemental electronic book content.

In some scenarios, individuals may control the supplemental electronic book content that is rendered via their client devices. In particular instances, a client device may include a physical input device, such as a dial, wheel, slider, button, etc., that can be actuated to indicate a level of supplemental electronic book content rendering. In other instances, the client device may render a representation of an input device via a touch sensitive display that can be utilized to set a level of supplemental electronic book content rendering. The level of supplemental content rendering may correspond to an amount of supplemental content related to an electronic book that is rendered when an individual is viewing the electronic book via the client device.

In certain implementations, the amount of supplemental content that is rendered may correspond to rendering supplemental content from a specified number of categories of supplemental electronic book content at a given time. To illustrate, a particular level of supplemental electronic book content rendering may relate to rendering social network activity and annotations associated with an electronic book, while another level of supplemental content rendering may relate to merely rendering social network activity related to the electronic book. In other implementations, the amount of supplemental electronic book content that is rendered may correspond to an amount of each category of supplemental content that is rendered. In one example, a specified level of supplemental content rendering may be directed to providing social networking activity from direct contacts of an individual associated with a social networking site. Additionally, a different level of supplemental electronic book content rendering may correspond to rendering social networking activity from direct contacts of the individual and contacts of the individual's direct contacts (e.g. Friends of Friends). In another example, one level of supplemental content rendering may correspond to providing annotations having at least a specified level of popularity, while another level of supplemental content rendering relates to providing annotations with at least a different level of popularity.

Thus, by aggregating supplemental content associated with electronic books from a number of sources, a service provider may conveniently provide supplemental electronic book content to individuals in a manner that allows individuals to avoid spending a lot of time locating supplemental content related to an electronic book, where the supplemental content is provided by various sources. Further, enabling individuals with the opportunity to control an amount of supplemental content rendering provides individuals with the flexibility to render more or less supplemental electronic book content at a given time. For example, in some cases, when an individual wants to focus merely on reading an electronic book without any distractions, the individual may set one level of supplemental content rendering, while in other situations, when the individual wants to read about what others are saying about an electronic book, the individual may set another level of supplemental content rendering. Further, by providing an easy to use physical input device and/or rendering a supplemental content rendering selector via a touch sensitive display of a client device, individuals may readily switch from one supplemental content rendering level to another.

Some implementations of the architectures and techniques described herein are described in the context of electronic books. The terms "electronic book" and/or "eBook," as used herein, may include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of digital items, such as audio digital content (e.g. music, audio books, etc.), video digital content (e.g. movies, multimedia presentations, etc.), image digital content (e.g. photographs, illustrations, etc.), and other content items that people watch, listen to, or otherwise experience.

Example Architecture

FIG. 1 illustrates an architecture 100 to render additional or less electronic book content according to input received from a user of a client device. The architecture 100 includes a client device 102 that may obtain electronic books on behalf of one or more individuals using the client device 102. The client device 102 may include an electronic book reader device, a desktop computer, a laptop computer, a tablet computer, a portable navigation system, a personal digital assistant (PDA), a media player, an entertainment device, a netbook, a gaming console, a smart phone, a mobile handset, a media center, an appliance, and the like. In some cases, the client device 102 may obtain the electronic books from an electronic book distributor 104. The electronic book distributor 104 may be a publisher of the electronic book, an author of the electronic book, another service provider, some other entity involved in the distribution of electronic books, combinations thereof, and so forth.

The client device 102 may also aggregate supplemental content associated with electronic books. For example, the client device 102 may obtain supplemental electronic book content from one or more sources, such as first information source 106 and second information source 108. In some situations, the first information source 106, the second information source 108, or both, may include a social networking site, a media outlet (e.g. a news site, a television station, a radio station, a news agency, a news service, etc.), a micro-blogging site, a blogging site, one or more individuals, combinations thereof, and the like. In certain instances, the information source 106 or the information source 108 may provide content to the client device 102 that is not related to an electronic book, such as email content from an email account of an individual, item acquisition information indicating items (e.g. goods, services, etc.) acquired by individuals, and so on.

In the illustrative implementation shown in FIG. 1, the information received by the client device 102 from the electronic book distributor 104, the first information source 106, and the second information source 108, may be referred to as client device data 110. The client device data 110 may include annotations 112. The annotations 112 may include notes, comments, etc., related to one or more portions of an electronic book. The annotations 112 may include text content, audio content, video content, image content, or combinations thereof. In addition, the annotations 112 may be provided by one or more individuals in relation to an electronic book obtained by the client device 102. The individuals providing the annotations 112 may be reading the electronic book or the individuals may have completed reading the electronic book. In some cases, the annotations 112 may be provided by an author of the electronic book, instructors teaching classes associated with the electronic book, and so forth. The annotations 112 may be provided to the client device 102 via the electronic book distributor 104, via another service provider, directly from the individuals contributing the annotations, or combinations thereof.

The client device data 110 may also include personal content 114. The personal content 114 may include email information, item acquisition history information, payment instrument information, information associated with an account with the electronic book distributor or other service provider, user preferences (e.g. electronic book likes and dislikes, content rendering preferences, etc.), electronic book ratings, calendar information, combinations thereof, and so forth. In addition, the client device data 110 may include social networking information 116, such as social networking site account information, social networking site posts, social networking site messages, etc. Further, the client device data 110 may include media outlet information 118. The media outlet information 118 may include text content, video content, audio content, image content, or combinations thereof, related to news pieces, blog posts, reviews, commentaries, and so on.

The client device 102 includes an electronic book content system 120 that performs operations related to obtaining and rendering electronic books and supplemental electronic book content. In a particular implementation, at 122, the electronic book content system 120 obtains electronic books 124 that are stored in computer-readable media of the client device 102. The electronic books 124 may include one or more particular electronic books, such as electronic book 126. In certain situations, the electronic books 124 may be acquired from the electronic book distributor 104 or another service provider when a user of the client device 102 provides value (e.g. currency, promotional points, etc.) in exchange for the electronic books 124.

In addition, at 128, the electronic book content system 120 may obtain supplemental electronic book content 130 that is stored in computer-readable media of the client device 102. The supplemental electronic book content 130 may be obtained from the electronic book distributor 104, the first information source 106, the second information source 108, or combinations thereof. In some situations, the electronic book content system 120 may receive supplemental content from a service provider that obtains and distributes supplemental content to client devices. In other scenarios, the electronic book content system 120 may filter content received from the electronic book distributor 104, the first information source 106, and/or the second information source 108 to determine whether the content is supplemental electronic book content. For example, the electronic book content system 120 may determine that some portions of the social networking information 116 are associated with one or more of the electronic books 124, while other portions of the social networking information 116 are not associated with one or more of the electronic books 124. In instances when portions of the social networking information 116 are associated with one or more of the electronic books 124, the electronic book content system 120 may store those portions as supplemental electronic book content 130. In another example, the electronic book content system 120 may store the annotations 112 as supplemental electronic book content 130 and refrain from storing one or more portions of the personal content 114 as supplemental electronic book content 130.

In certain instances, the electronic book content system 120 may identify portions of the client device data 110 as supplemental electronic book content 130 based on tags or other metadata associated with the portions of the client device data 110. In other situations, the electronic book content system 120 may apply algorithms, such as machine learning algorithms, to identify portions of the client device data 110 that are supplemental electronic book content 130. To illustrate, the electronic book content system 120 may analyze words of portions of the client device data 110 to identify titles, authors, characters, etc. that are associated with the electronic books 124 and store certain client device data 110 as supplemental electronic book content 130 based on the analysis of the client device data 110.

At 132, the electronic book content system 120 may determine portions of the supplemental content to render with corresponding portions of an electronic book, such as the electronic book 126. In particular, the electronic book content system 120 may identify portions of the supplemental electronic book content 130 that are associated with the electronic book 126. In addition, the electronic book content system 120 may identify a particular portion of the electronic book 126 that is being viewed, such as a particular page, particular line numbers, a particular article, etc., and determine portions of the supplemental electronic book content 130 that correspond to the particular portion of the electronic book 126 being viewed. For example, the electronic book content system 120 may identify particular annotations 112 that are associated with a page being viewed via a display of the client device 102 and/or particular social networking activity 116 that is related to the portion of the electronic book 126 being viewed via the client device 102.

Further, the electronic book content system 120 may determine portions of the supplemental electronic book content 130 to render based, at least in part, on a level of supplemental content rendering. The level of supplemental content rendering may correspond to an amount of the supplemental electronic book content 130 to render in association with one or more portions of electronic books, such as the electronic book 126. The level of supplemental content rendering may be set by a user of the client device 102, the electronic book distributor 104, a publisher of the electronic book 126, a manufacturer or distributor of the client device 102, or combinations thereof. In some cases, the level of supplemental content rendering may be associated with a particular electronic book or the level of supplemental content rendering may be set for all books rendered via the client device 102.

In some cases, the level of supplemental content rendering may be associated with a number of categories of supplemental content to render along with content of the electronic book 126. To illustrate, a particular level of supplemental content rendering may correspond to rendering content related to the annotations 112, the social networking information 116, and the media outlet information 118 associated with a particular portion of the electronic book 126. Another level of supplemental content rendering may correspond to rendering supplemental content related to the annotations 112 and the social networking information 116.

In other situations, the level of supplemental content rendering may correspond to an amount of supplemental content to render from each of a number of categories of the supplemental electronic book content 130. For example, a specified level of supplemental content rendering may correspond to rendering annotations having a first level of popularity, social networking site posts from individuals having a first category of relationship with a user of the client device 102, media outlets providing information associated with locations within a first distance of a location of the client device 102, and so forth. Additionally, when a second level of supplemental content rendering is set, annotations having a second level of popularity may be rendered, social networking information of individuals having a second relationship with a user of the client device 102 may be rendered, and information from media outlets associated with locations that are a second distance from the client device may be rendered in association with a particular portion of the electronic book 126.

In a particular illustration, the specified level of supplemental content rendering may indicate that annotations receiving a specified number of ratings above a predetermined level (e.g. 4 out of 5 stars) will be rendered along with associated content from the electronic book 126. In another illustration, the specified level of supplemental content rendering may indicate that social networking site posts from individuals that are contacts of contacts of a user of the client device 102 according to a particular social networking site will be rendered in conjunction with an associated portion of the electronic book 126. Further, the specified level of supplemental content rendering may indicate that information provided by media outlets that is related to locations within the same country as the client device 102 and that is associated with at least a particular portion of the electronic book 126 may be rendered in conjunction with the particular portion of the electronic book 126.

At 134, the electronic book content system 120 may render a portion of the electronic book 126 and any related supplemental electronic book content 130 based at least partly on a specified supplemental content rendering level. In an illustrative implementation, the electronic book content system 120 may provide a user interface 136 that includes an electronic book portion 138 and first supplemental electronic book content 140. The electronic book content system 120 renders the amount of first supplemental electronic book content 140 in accordance with a first level of supplemental content rendering 142. Additionally, the electronic book content system 120 may provide the user interface 136 having the electronic book portion 138 and second supplemental electronic book content 144. The amount of the second supplemental electronic book content 144 rendered by the electronic book content system 120 is specified by a second level of supplemental content rendering 146. In the illustrative example of FIG. 1, the amount of the supplemental electronic book content 130 that is included in the first supplemental electronic book content 140 and the second electronic book content 144 are different.

In certain situations, the level of supplemental content rendering may be modified from the first level of supplemental content rendering 142 to the second level of supplemental content rendering 146 in response to actuation of a physical input device of the client device 102. In other scenarios, the level of supplemental content rendering may be modified in response to input received in relation to a portion of a touch sensitive display of the client device 102 that includes a representation of a device to modify a supplemental content rendering level. In an illustrative example, the physical input device and/or a virtual input device may be associated with indicia (e.g. numbers from 0 to 10), where each indicia corresponds to a level of supplemental content rendering. In this example, a particular indicia, such as the number zero, may correspond to providing no supplemental content with electronic book content, while another indicia, such as the number ten, may correspond to providing a maximum amount of supplemental content with the electronic book content. Additionally, in some cases, the level of supplemental content rendering may be modified while a user of the client device 102 is viewing a particular portion of an electronic book.

Example System

Figure 2:
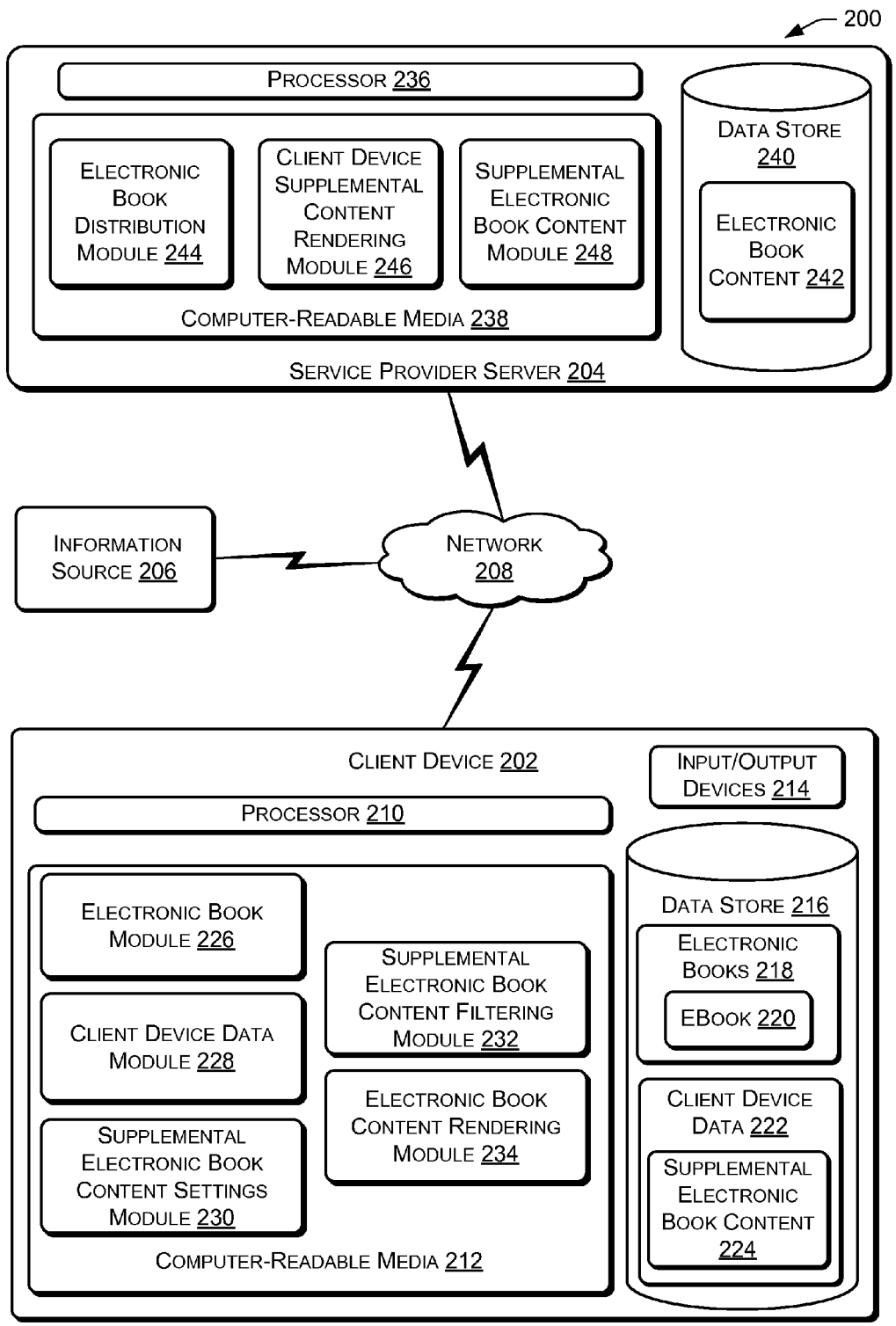
FIG. 2 illustrates a system to render supplemental electronic book content.

FIG. 2 illustrates a system 200 to render supplemental electronic book content. The system 200 includes a client device 202 that may be operated by one or more individuals (not shown) to obtain and render electronic books and supplemental electronic book content. The system 200 also includes a service provider server 204 associated with a service provider that may comprise a single server, a cluster of servers, a server farm or data center, and so forth, although other server architectures (e.g., a mainframe architecture, a cloud computing architecture, etc.) may also be used. Further, the system 200 may include one or more information sources represented by the information source 206. The information source 206 may provide information to the client device 202, the service provider server 204, or both. In some cases, the information source 206 may provide supplemental content related to electronic books. The information source 206 may include a social networking site, a micro-blogging site, a blog site, a media outlet, a media outlet site, another client device, a publisher of an electronic book, combinations thereof, and the like. The client device 202, the service provider server 204, and the information source 206 may communicate via a network 208. The network 208 may include any one or combination of multiple different types of wired and wireless networks, such as the Internet, cable networks, satellite networks, wide area wireless communication networks, wired local area networks, wireless local area networks, and public switched telephone networks (PSTN).

The client device 202 includes one or more processors indicated by the processor 210. The client device 202 also includes computer-readable media 212 that is accessible to the processor 210. In some examples, the computer-readable media 212 may include computer-readable storage media and may include volatile memory, nonvolatile memory, removable memory, non-removable memory, or a combination thereof. For example, the computer-readable media 212 may include, but is not limited to, RAM, ROM, EEPROM, flash memory, one or more hard disks, solid state drives, optical memory (e.g. CD, DVD), or other non-transient computer-readable media or processor-accessible storage technologies. The computer-readable media 212 may store a number of modules including computer-readable instructions executable by the processor 210 to obtain and render electronic books and supplemental content related to electronic books. In some cases, one or more of the modules may be implemented as part of the electronic book content system 120 of FIG. 1.

The client device 202 may also include one or more input/output devices 214, such as a display, a touchpad, a touch screen, a pointer device, speakers, microphones, keyboard, image capture devices (e.g. camera, scanner), one or more buttons, a trackball, a wheel, a slider, a dial, and the like. The client device 202 may also include a data store 216 that may include, but is not limited to, RAM, ROM, EEPROM, flash memory, one or more hard disks, solid state drives, optical memory (e.g. CD, DVD), or other non-transient computer-readable media or processor-accessible storage technologies. In some implementations, the data store 216 may include or may access remote storage technologies, such as a network attached storage, cloud storage, a storage area network, or the like. The data store 216 stores one or more electronic books 218, such as electronic book 220. In addition, the data store 216 stores client device data 222 that may include information received from the information source 206 and/or the service provider server 204. For example, the client device data 222 may include information from a social networking site account of a user of the client device 202, micro-blogging site account information of a user of the client device 202, information from other accounts of a user of the client device 202 (e.g. financial accounts, online retailer accounts, email accounts, messaging accounts, etc.), information from media outlet sites, information from other sites, information from other client devices of a user of the client device 202, combinations thereof, and so forth. In certain situations, portions of the client device data 222 may be generated by applications executing on the client device 202, such as calendaring applications, media player applications, electronic book reading applications, and the like.

The client device data 222 may include supplemental electronic book content 224 that includes content associated with one or more of the electronic books 218. In some cases, the supplemental electronic book content 224 may also relate to electronic books that are not currently stored in the client device 202, but may have been previously stored in the client device 202 or accessed by a user of the client device 202. For example, the supplemental electronic book content 224 may be associated with one or more electronic books that are stored in a remote storage space (e.g. cloud computing storage space) and/or an external storage space (e.g. external hard drive, additional client device, etc.) of a user of the client device 202. The supplemental electronic book content 224 may include annotations of one or more users of the client device 202, annotations of other individuals, social networking site comments, micro-blogging site posts, media outlet information (e.g. news piece about author of one of the electronic books 218, article about a movie release related to one of the electronic books 218, etc.), combinations thereof, and so forth.

The computer-readable media 212 may store an electronic book module 226 that is executable by the processor 210 to obtain the electronic books 218 from one or more electronic book distributors and store the electronic books 218 in the data store 216. In some cases, the electronic book module 226 may obtain the electronic books 218 from the service provider server 204, a publisher of the electronic books 218, an author of the electronic books 218, another service provider, or combinations thereof. In certain implementations, a user of the client device 202 may acquire an electronic book via a site of an electronic book distributor. In these implementations, the electronic book module 226 may communicate with the electronic book distributor to obtain the electronic book via the network 208. Additionally, a user of the client device 202 may acquire a subscription to an electronic book (e.g. magazine subscription, journal subscription, etc.) and the electronic book module 226 may receive a number of versions and/or issues of the electronic book from an electronic book distributor at one or more times. Further, the electronic book module 226 may receive updated content related to the electronic books 218 from an electronic book distributor.

The computer-readable media 212 also stores a client device data module 228 that is executable by the processor 210 to obtain and store the client device data 222. In some cases, the client device data module 228 may operate in conjunction with one or more application programming interfaces (APIs), one or more webservices, one or more plug-ins, RSS (Really Simple Syndication) Feed readers/aggregators, and the like, to obtain the client device data 222 from the information sources 206, the service provider server 204, or both. Additionally, the client device data module 228 may include or operate in association with one or more specialized apps or plug-ins executing on the client device 202 to obtain the client device data 222.

In an illustrative implementation, the client device data module 228 may communicate with a social networking site via an API, an app, a webservice, or combinations thereof, to obtain information associated with the social networking site. In some cases, the social networking site information may be associated with an account of a user of the client device 202 with the social networking site. The social networking site information may also be related to accounts of other individuals with the social networking site in other instances. The client device data module 228 may also obtain portions of the client device data 222 via an RSS feed associated with a media outlet, a blog, and so forth. The client device data module 228 may also obtain annotations related to the electronic books 218 via the service provider server 204, via another service provider that aggregates annotations, via client devices of individuals, combinations thereof, and so on. Further, the client device data module 228 may operate in conjunction with applications and/or programs of the client device 202 to obtain portions of the client device data 222. For example, the client device data module 228 may operate in association with a calendaring application, a word processor application, an email application, and so forth, to obtain information that is related to electronic books. The client device data module 228 may also receive indications from an electronic book reader application of the client device 202 specifying that annotations provided by a user of the client device 202 are stored as portions of the client device data 222.

In addition, the computer-readable media 212 includes a supplemental electronic book content setting module 230 that is executable by the processor 210 to determine a supplemental electronic book content rendering level for one or more of the electronic books 218. In some situations, the supplemental electronic book content settings module 230 may receive data indicating actuation of a physical input device (e.g. a button, a dial, a control knob, a scroll wheel, a slider, etc.) of the client device 202 that is associated with selection of a supplemental electronic book content rendering level. In certain instances, the physical input device may be dedicated to selection of a supplemental electronic book content rendering level, while in other scenarios the physical input device may be associated with various selection operations (e.g. volume level selection, on/off button, etc.) in addition to selection of a supplemental electronic book content rendering level.

The supplemental electronic book content settings module 230 may also receive data indicating selection of a supplemental electronic book content rendering level via a touch sensitive area of the client device 202. In some implementations, the touch sensitive area may be a touch sensitive display of the client device 202. In an illustrative example, a representation of an input device may be rendered on a display of the client device 202 and the supplemental electronic book content settings module 230 may receive input specifying selection of a particular supplemental electronic book content rendering level in relation to the representation of the input device shown on the touch sensitive display. In particular instances, the input may be provided by a finger of a user of the client device 202, a stylus, or both. Further, the supplemental electronic book content settings module 230 may receive audio input, image input, video input, and the like, via the input/output devices 214 indicating selection of a particular supplemental electronic book content rendering level.

In some cases, a supplemental electronic content rendering level may be set for one or more particular electronic books of the electronic books 218. For example, a first supplemental electronic book content rendering level may be set for a first electronic book, while a second supplemental electronic book content rendering level may be set for a second electronic book. In addition, a particular supplemental electronic content rendering level may be set that corresponds to each of the electronic books 218. Further, the supplemental electronic book content settings module 230 may modify a supplemental content rendering level for one or more of the electronic books 218 in response to receiving input indicating a change in a supplemental electronic book content rendering level. The supplemental electronic book content settings module 230 may modify a supplemental electronic book content rendering level at various times, such as while displaying a portion of an electronic book, before accessing an electronic book, before powering up the client device 202, and so forth.

The computer-readable media 212 stores a supplemental electronic book content filtering module 232 that is executable by the processor 210 to determine supplemental content to render in association with corresponding electronic books, such as the electronic books 218. In particular, the supplemental electronic book content filtering module 232 may determine a level of supplemental content rendering for a particular electronic book, such as the electronic book 220, according to information obtained from the supplemental electronic book content settings module 230. The supplemental electronic book content filtering module 232 may then identify supplemental content that corresponds to at least a portion of the electronic book 220 and also determine an amount of the supplemental content to render in association with portions of the electronic book 220 based at least partly on the supplemental electronic book content rendering level.

In an illustrative implementation, the supplemental electronic book content filtering module 232 may analyze at least portions of the client device data 222 to identify any portions of the client device data 222 that are associated with the electronic book 220, such as annotations, social networking site comments, news articles, etc. In certain situations, the supplemental electronic book content filtering module 232 may identify portions of the client device data 222 that are associated with the electronic book 220 based, at least in part, on metadata associated with the client device data 222. For example, portions of the client device data 222 may include tags indicating that the portions are related to the electronic book 220. In some cases, metadata indicating an association with the electronic book 220 may be provided by the entity providing the portions of the client device data 222 to the client device 202. To illustrate, the service provider server 204 may provide annotations related to the electronic book 220 to the client device 202 and also provide metadata along with the annotations indicating that the annotations are associated with the electronic book 220. The metadata may also indicate particular portions of the electronic book 220 (e.g. a particular page, particular line numbers, a particular offset, etc.) that correspond to each annotation. In another illustration, a media outlet may provide metadata indicating that a news article includes content associated with the electronic book 220.

Additionally, the supplemental electronic book content filtering module 232 may analyze portions of the client device data 222 to determine whether the portions of the client device data 222 include keywords, phrases, and/or other indicators that may link the portions of the client device data 222 to the electronic book 220. For example, the supplemental electronic book content filtering module 232 may analyze content of social networking site posts to determine whether the social networking site posts include the title of the electronic book 220, an author of the electronic book 220, names of characters of the electronic book 220, names of places of the electronic book 220, portions of text of the electronic book 220, images and/or illustrations of the electronic book 220, combinations thereof, and so forth. The supplemental electronic book content filtering module 232 may also analyze annotations, media outlet information, email information, calendar information, and so forth to identify content that indicates a link with the electronic book 220. The supplemental electronic book content filtering module 232 may utilize one or more machine learning algorithms to associate portions of the client device data 222 with the electronic book 220. In some situations, the supplemental electronic book content filtering module 232 may provide metadata with respect to particular portions of the client device data 222 that have been analyzed specifying that the particular portions of the client device data 222 are associated with the electronic book 220 and/or that the particular portions of the client device data 222 are associated with a specified section of the electronic book 220.

The supplemental electronic book content filtering module 232 may also determine an amount of supplemental content to render in association with portions of the electronic book 220 based at least partly on a supplemental content rendering level for the electronic book 220. For example, the supplemental electronic book content filtering module 232 may determine that information associated with a specified number of categories of supplemental content is to be rendered in association with portions of the electronic book 220 based on the supplemental content rendering level of the electronic book. To illustrate, the supplemental electronic book content filtering module 232 may determine that a first supplemental content rendering level is associated with providing information from certain categories of supplemental content and a second supplemental content rendering level is associated with providing information from different categories of supplemental content.

In an illustrative implementation, the supplemental electronic book content filtering module 232 may determine that annotations and social networking site information corresponding to the electronic book 220 may be rendered in association with the first supplemental content rendering level, while annotations, social networking site information, and media outlet information may be rendering in association with the second supplemental content rendering level. In particular scenarios, the amount of information from each category of information may be the same for each supplemental content rendering level (e.g. the same four annotations may be displayed for different supplemental content rendering levels), but the number of categories from which information is rendered changes. In some scenarios, the information rendered for each category may be based at least partly on one or more criteria that may be specified by a publisher of the electronic book 220, a distributor of the electronic book 220, a user of the client device 202, a manufacturer and/or distributor of the client device 202, one or more service providers, combinations thereof, and so forth. Further, the categories from which information is rendered for particular supplemental content rendering levels may depend on access of information from each category by one or more users of the client device 202. For example, when a user of the client device 202 accesses annotations about electronic books more frequently than social networking site posts about electronic books, the supplemental electronic book content filtering module 232 may determine that information related to social networking site posts may be removed from being rendered when the level of supplemental content rendering is modified from a level that is associated with a particular number of categories of information to a level associated with fewer categories of information, that is, a level corresponding to rendering less supplemental content about the electronic book 220.

Further, the amount of supplemental electronic book content rendering in association with the electronic book 220 may correspond to an amount of supplemental content rendered with respect to each of a number of categories of supplemental electronic book content. In particular, supplemental content associated with particular categories may be rendered in association with certain portions of the electronic book 220. For example, when the client device 202 renders a portion of the electronic book 220 (e.g. a particular page, a particular section, etc.), annotations, social networking information, and media outlet information associated with the electronic book 220 may also be rendered. The amount of content associated with the annotations, social networking information, and media outlet information is based at least partly on a supplemental content rendering level. To illustrate, the supplemental electronic book content filtering module 232 may determine that three items are to be rendered with respect to each particular category (e.g. three annotations, three social networking site posts, three news pieces) in association with a first supplemental content rendering level and that two items are to be rendered with respect to each particular category in association with a second supplemental content rendering level. The categories of supplemental content may be determined based on one or more criteria, such as preferences of a service provider providing the supplemental content, preferences of a manufacturer and/or distributor of the client device, preferences of a publisher of the electronic book 220, preferences of one or more users of the client device 202, combinations thereof, and the like.

The supplemental electronic book content filtering module 232 may determine the items to be rendered in association with each particular category based on popularity of the item, ratings of the item, rankings of the item, time since the item was published, preferences of one or more users of the client device 202, preferences of an author of the item, preferences of a distributor of the item, combinations thereof, and the like. In an illustrative example, the supplemental electronic book content filtering module 232 may determine or access data indicating that certain annotations associated with a particular portion of the electronic book 220 have been viewed by a specified number of individuals. In this example, the supplemental electronic book content filtering module 232 may indicate that annotations for the particular portion of the electronic book 220 are to be rendered in descending order from the annotation having the highest number of views to the annotation having the fewest views depending on the particular supplemental content rendering level. Thus, for a first level of supplemental content rendering, the three annotations having the highest number of views relative to other annotations may be rendered, while for a second level of supplemental content rendering, the five annotations having the highest number of views may be rendered. In another example, the supplemental electronic book content filtering module 232 may determine a number of annotations viewed by a user of the client device 202 that are provided by particular individuals and rank the individuals according to the number of views by the user. The supplemental electronic book content filtering module 232 may then indicate that annotations associated with individuals having certain threshold rankings are rendered in association with particular corresponding portions of the electronic book 220. When a user of the client device 202 indicates preferences with respect to certain categories of information, such as viewing annotations from classmates or viewing news articles from a particular news agency, the supplemental electronic book content filtering module 232 may apply rankings, scores, comparisons, etc. within the subset of entities associated with the preferences. To illustrate, the additional electronic book content filtering module 232 may determine that individuals in the same class as a user of the client device 202 providing annotations viewed by a first threshold number of other individuals will be rendered in association with a first supplemental content rendering level and that the individuals in the class of the user providing annotations viewed by a second threshold number of other individuals will be rendered in association with a second supplemental content rendering level.

The computer-readable media 212 also stores an electronic book content rendering module 234 that is executable by the processor 210 to render electronic books and supplemental content associated with the electronic books. For example, the electronic content rendering module 234 may render text content, image content, and/or video content of electronic books by generating images associated with the text content, image content, and/or video content and displaying the images on one or more displays of the client device 202. Additionally, in some situations, the client device 202 may provide content associated with electronic books and other digital items (e.g. digital versions of movies, television programs, audio books, music, etc.) via one or more additional output devices of the client device 202, such as speakers.

The electronic book content rendering module 234 may render the supplemental content according to a level of supplemental electronic book content rendering. The electronic book content rendering module 234 may operate in conjunction with the supplemental electronic book content settings module 230 and the supplemental electronic book content filtering module 232 to render supplemental content in association with a particular electronic book.

In an illustrative implementation, the electronic book content rendering module 234 may receive a request to view a particular portion of the electronic book 220. The electronic book content rendering module 234 may communicate with the supplemental electronic book content settings module 230 to determine a level of supplemental content rendering for the electronic book 220 or for the particular portion of the electronic book 220. The electronic book content rendering module 234 may also communicate with the supplemental electronic book content filtering module 232 to identify portions of the supplemental electronic book content 224 to render in association with the particular portion of the electronic book 220 based on the level of supplemental content rendering. For example, the electronic book content rendering module 234 may communicate with the supplemental electronic book content filtering module 232 to determine that two annotations, three social networking posts, and two news articles are to be rendered in association with the particular portion of the electronic book 220 for a particular supplemental electronic book content rendering level. Additionally, the electronic book content rendering module 234 may communicate with the supplemental electronic book content filtering module 232 to identify the particular annotations, social networking site posts, and articles stored as portions of the supplemental electronic book content 224 to render in association with the particular portion of the electronic book 220. The electronic book content rendering module 234 may then render the particular portion of the electronic book 220 in association with the particular annotations, social networking site posts, and articles.

The service provider server 204 includes one or more processors indicated by processor 236 and computer-readable media 238. Additionally, the service provider server 204 may include or be coupled to a data store 240. The computer-readable media 238 and the data store 240 are examples of computer-readable storage media and may include volatile memory, nonvolatile memory, removable memory, non-removable memory, or a combination thereof. Thus, the computer-readable media 238 and the data store 240 may include, but are not limited to, RAM, ROM, EEPROM, flash memory, one or more hard disks, optical memory, or other non-transient computer-readable media or processor-accessible storage technologies. The computer-readable media 238 includes a number of modules including computer-readable instructions executable by the processor 236 to distribute electronic books and supplemental electronic book content.

The data store 240 may store electronic book content 242 that includes one or more electronic books and supplemental electronic book content. The electronic books may be obtained from one or more electronic book distributors, one or more publishers, one or more authors, or combinations thereof. The supplemental electronic book content may be obtained from the one or more information sources 206.

The computer-readable media 238 includes an electronic book distribution module 244 that is executable by the processor 236 to provide electronic books to client devices. In some cases, the electronic book distribution module 244 may provide electronic books in response to a request for the electronic books. In a particular implementation, the electronic book distribution module 244 may receive a request from the client device 202 to acquire an electronic book and, in response, the electronic book distribution module 244 may provide the electronic book to the client device 202. In certain situations, the electronic book distribution module 244 may provide portions of the electronic books to the client devices in response to one or more requests for the electronic books. To illustrate, the electronic book distribution module 244 may provide one or more pages, a specified number of lines, and so forth to the client devices at any particular time. Additionally, the electronic book distribution module 244 may periodically provide electronic books to client devices according to a subscription and provide updates to electronic books as the updates become available.

In addition, the computer-readable media 238 includes a client device supplemental content rendering level module 246 that is executable by the processor 236 to obtain settings of client devices related to providing supplemental content in association with electronic books. In particular, the client device supplemental content rendering module 246 may receive indications from client devices specifying a supplemental content rendering level associated with an electronic book related to the client devices. For example, when a user of the client device 202 sets a supplemental content rendering level, the client device 202 may send data indicating the supplemental content rendering level to the service provider server 204. In other situations, the service provider may determine and store the supplemental content rendering level, which is accessible by the client device supplemental content rendering level module 246.

The computer-readable media 238 also includes a supplemental electronic book content module 248 that is executable by the processor 236 to obtain and distribute supplemental content associated with electronic books. In particular, the supplemental electronic book content module 248 may obtain supplemental electronic book content from the one or more information sources 206. For example, the supplemental electronic book content module 248 may receive annotations related to electronic books, social networking site information related to electronic books, media outlet information related to electronic books, combinations thereof, and so forth. In some cases, the supplemental electronic book content module 248 may operate in conjunction with one or more webservices, one or more APIs, one or more plug-ins, one or more apps, or combinations thereof, to obtain supplemental electronic book content from the information sources 206. The supplemental electronic book content module 248 may also subscribe to RSS feeds to obtain supplemental electronic book content from the information sources 206, scrape sites to obtain supplemental electronic book content from the information sources 206, or both. In certain scenarios, the supplemental electronic book content module 248 may send requests to the information sources 206 for supplemental electronic book content.

The supplemental electronic book content module 248 may also utilize data indicating a supplemental content rendering level to filter supplemental electronic book content before providing supplemental electronic book content to client devices. In some instances, the supplemental electronic book content module 248 may perform at least some of the operations of the supplemental electronic book content filtering module 232 to identify supplemental electronic book content to provide to client devices. In an illustrative implementation, the supplemental electronic book content module 248 may utilize a supplemental content rendering level of the client device 202 that is associated with the electronic book 220 to filter supplemental content corresponding to one or more portions of the electronic book 220 and provide the filtered supplemental content to the client device 202. For example, the supplemental electronic book content module 248 may identify a particular number of items for one or more categories of supplemental content to provide to the client device 202 in association with the electronic book 220, such as certain annotations, specified social networking site posts, particular media outlet information, and so forth, based on a supplemental content rendering level of the client device 202.

Example User Interfaces

FIG. 3 illustrates a user interface 300 including supplemental electronic book content according to a first level of supplemental content rendering. The user interface 300 may be provided on a display of a client device, such as the client device 102 of FIG. 1 or the client device 202 of FIG. 2. The user interface 300 includes a portion 302 having text of an electronic book. Additionally, the portion 302 includes highlighted content 304.

Further, the user interface 300 includes supplemental content associated with the electronic book, with the portion 302, with the highlighted content 304, or combinations thereof. The supplemental content may be associated with one or more categories of supplemental content. In particular, the user interface 300 includes a portion 306 that includes annotations associated with the electronic book. In some situations, the annotations may be associated with the portion 302, the highlighted content 304, or both. In addition, the user interface 300 includes a portion 308 having social network activity related to the electronic book and a portion 310 including media outlet information corresponding to the electronic book.

Figure 4:
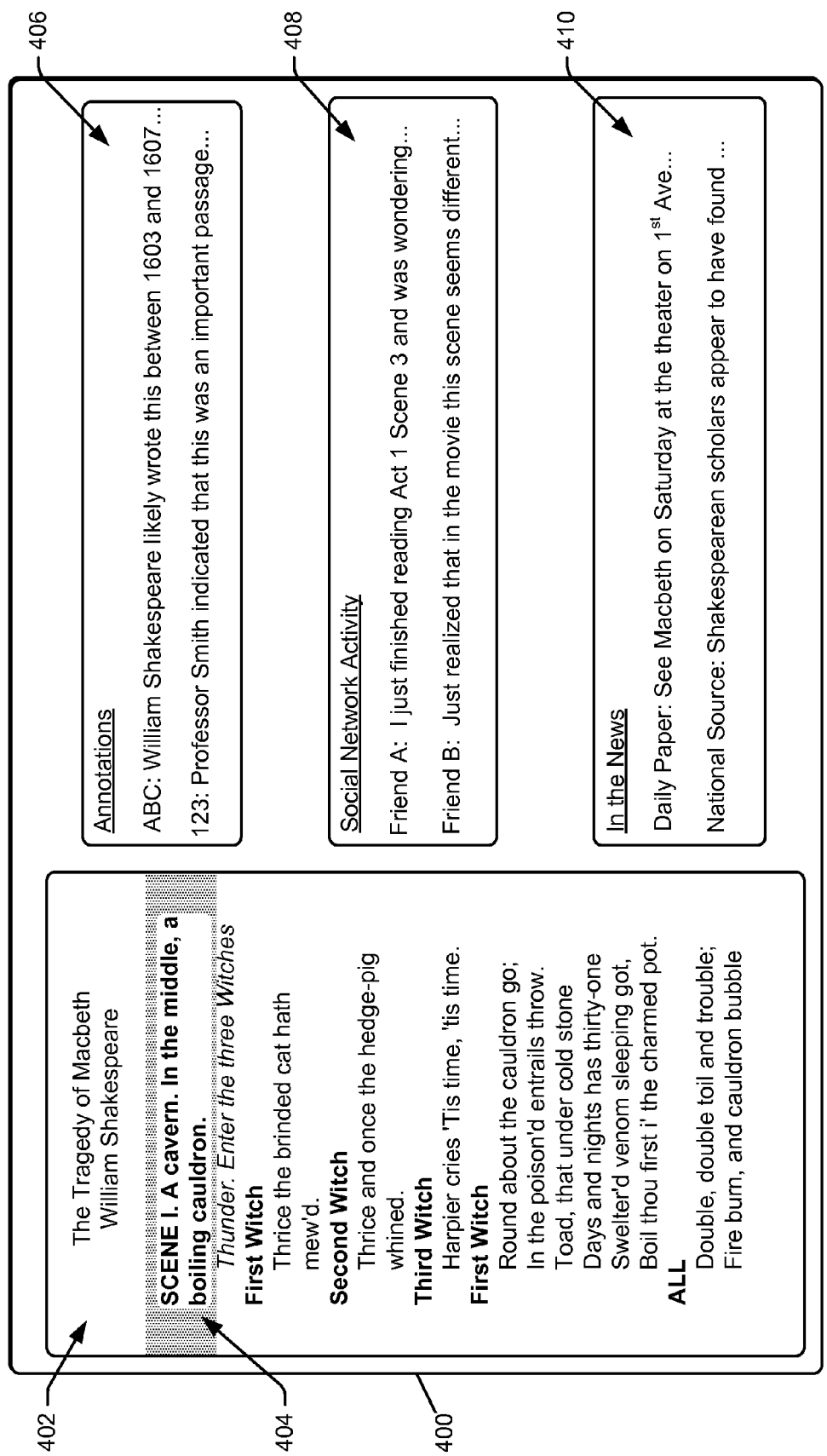
FIG. 4 illustrates a user interface including supplemental electronic book content according to a second level of supplemental content rendering, where the amount of supplemental content for each category of supplemental content is reduced.

FIG. 4 illustrates a user interface 400 including supplemental electronic book content according to a second level of supplemental content rendering, where the amount of supplemental content for each category of supplemental content is reduced. In particular, the user interface 400 may represent changes to the user interface 300 after a supplemental content rendering level represented by the user interface 300 of FIG. 3 is modified. The user interface 400 includes a portion 402 of an electronic book and highlighted content 404. Additionally, the user interface 400 includes a portion 406 having annotations associated with the electronic book, the portion 402, the highlighted content 404, or combinations thereof. The user interface 400 also includes a portion 408 showing social network activity and a portion 410 including media outlet information associated with the electronic book, the portion 402, the highlighted content 404, or combinations thereof. In the illustrative example of FIG. 4, the user interface 400 includes information from the same categories as the user interface 300 (e.g. annotations, social network activity, and media outlet information), but includes less information from each category. Thus, the amount of supplemental content provided via the user interface 400 decreases with respect to the amount of supplemental content provided on the user interface 300.

Figure 5:
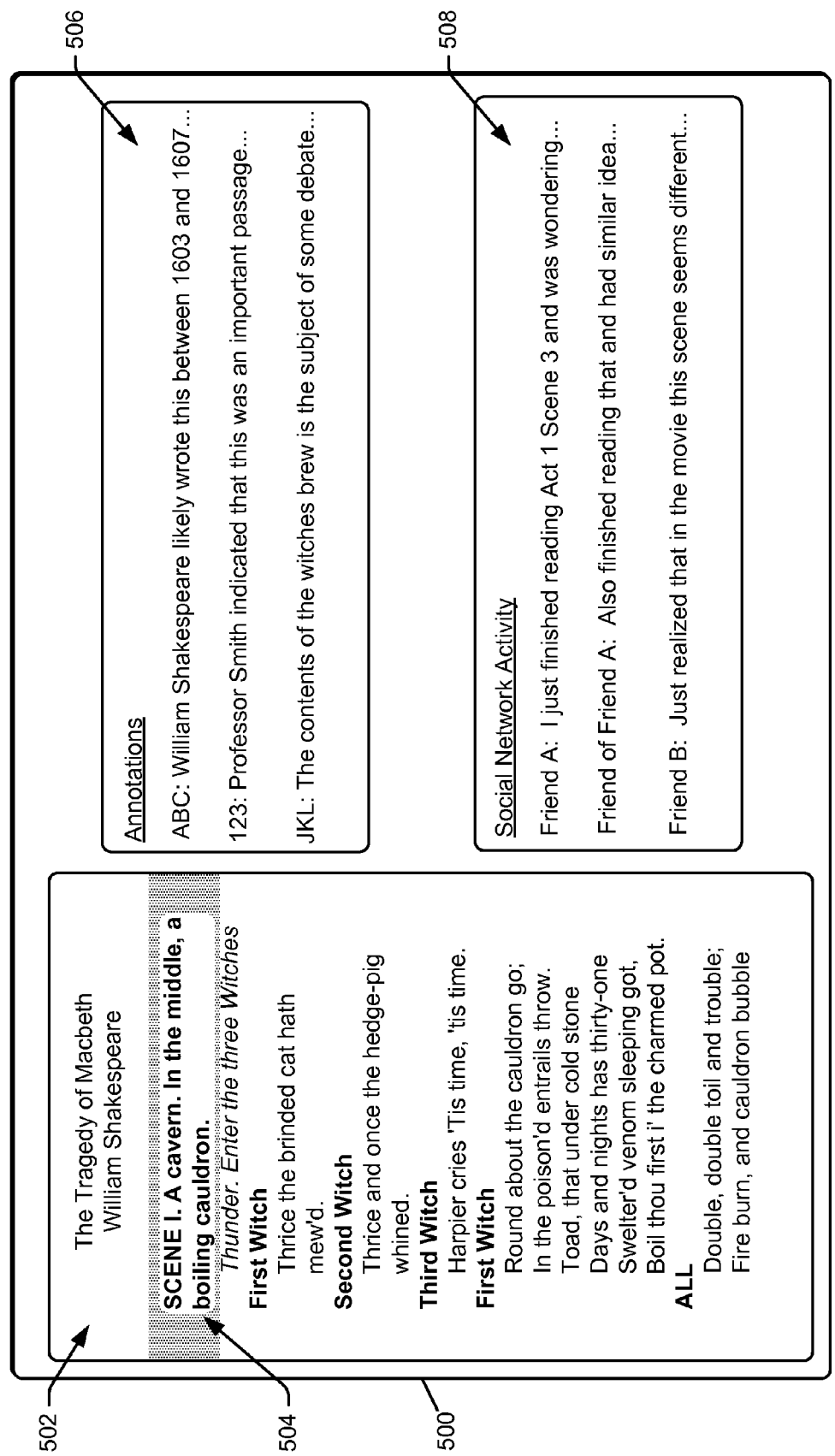
FIG. 5 illustrates a user interface including supplemental electronic book content according to a second level of supplemental content rendering, where the number of categories of supplemental content rendered is reduced.

FIG. 5 illustrates a user interface 500 including supplemental electronic book content according to a second level of supplemental content rendering, where the number of categories of supplemental content rendered is reduced. The user interface 500 may represent changes to the user interface 300 after the supplemental content rendering level associated with the user interface 300 of FIG. 3 is modified. The user interface 500 includes a portion 502 of an electronic book and highlighted content 504. Additionally, the user interface 500 includes a portion 506 having annotations associated with the electronic book, the portion 502, the highlighted content 504, or combinations thereof. The user interface 500 also includes a portion 508 showing social network activity associated with the electronic book, the portion 502, the highlighted content

504, or combinations thereof. In the illustrative example of FIG. 5, the user interface 500 includes information from fewer categories than the user interface 300 (e.g. annotations and social network activity as opposed to annotations, social network, activity, and media outlet information), but includes the same information from the remaining categories. Thus, the amount of supplemental content provided on the user interface 500 decreases with respect to the amount of supplemental content provided on the user interface 300. Although FIG. 4 and FIG. 5 illustrate examples when the amount of supplemental content provided via the user interfaces 400 and 500 are less than the supplemental content provided via the user interface 300, other implementations may be directed to providing user interfaces that include an increased amount of supplemental content in relation to the amount of supplemental content provided via the user interface 300.

Example Processes

FIGS. 6-9 show processes 600-900 respectively, to control the rendering of supplemental content associated with electronic books. The processes 600-900 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The operations described with respect to FIGS. 6-9 may be performed by one or more components of FIGS. 1-2, such as the client 102, the client device 202, the service provider server 204, another computing device, combinations thereof, and so on.

Figure 6:
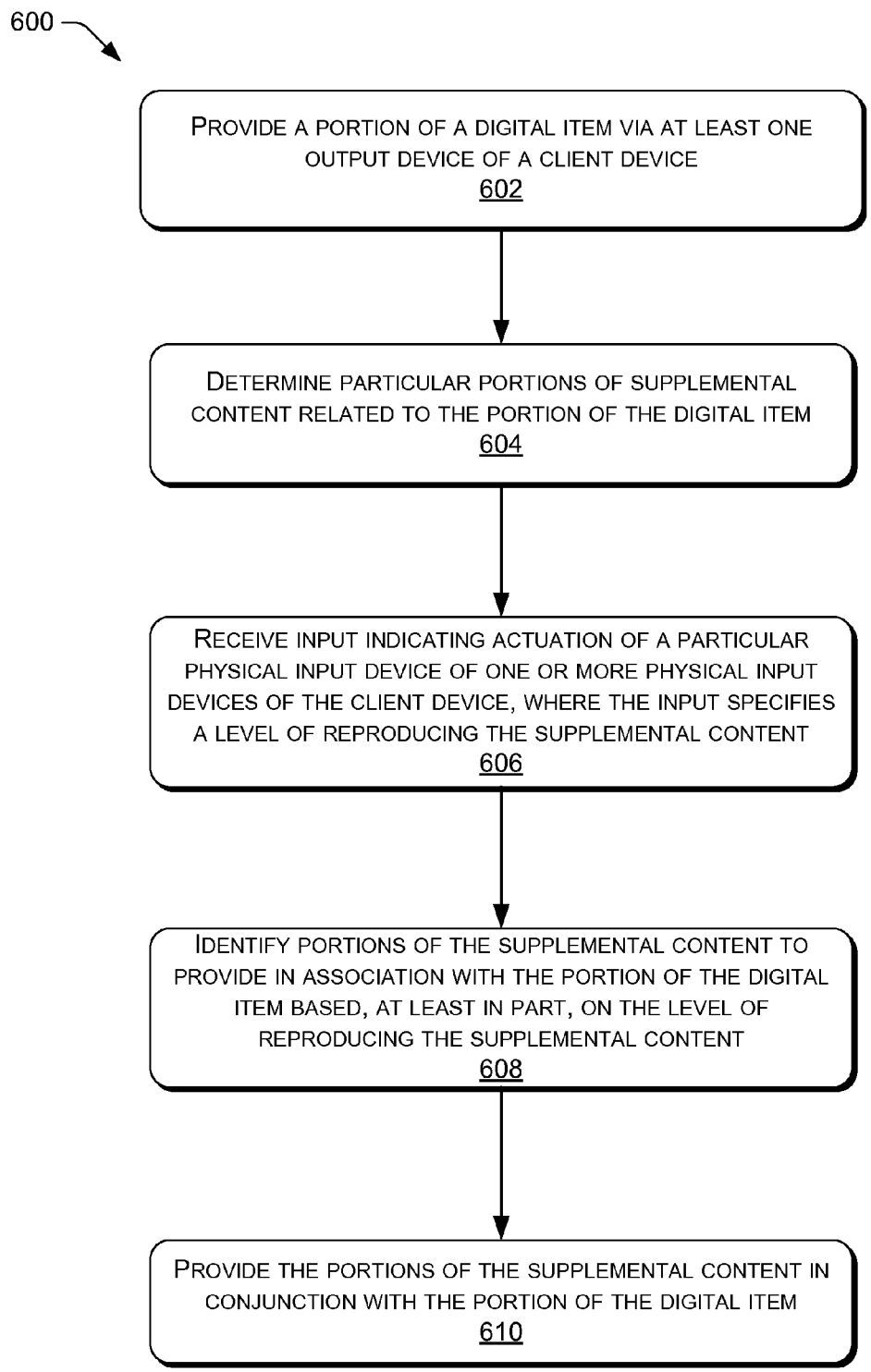
FIG. 6 is a flow diagram of a process to provide supplemental electronic book content according to a particular level of reproducing supplemental content.

FIG. 6 is a flow diagram of a process 600 to provide supplemental electronic book content according to a particular level of reproducing supplemental content. At 602, the process 600 includes providing a portion of a digital item via at least one output device of a client device. At 604, the process 600 includes determining particular portions of supplemental content that are related to the portion of the digital item. The supplemental content may be received from a plurality of sources.

At 606, the process 600 includes receiving input indicating actuation of a particular physical input device of one or more physical input devices of the client device. The one or more physical input devices may include one or more buttons, a wheel (e.g. a scroll wheel), a sliding input device, a dial, a control knob, or combinations thereof. The input may specify a level of reproducing the supplemental content.

The level of reproducing supplemental content rendering may be one of a plurality of levels of reproducing supplemental content rendering and each level of reproducing supplemental content rendering may correspond to reproducing a specified amount of the supplemental content. In some cases, a first level of reproducing supplemental content may be associated with a first portion of the supplemental content and a second level of reproducing supplemental content may be associated with a second portion of the supplemental content. The second portion of the supplemental content may include the first portion of the supplemental content and one or more additional portions of the supplemental content. In certain situations, one digital item stored in the computer-readable media of the client device may be associated with the first level of reproducing the supplemental content and an additional digital item stored by the computer-readable media may be associated with the second level of reproducing supplemental content.

At 608, the process 600 includes identifying portions of the supplemental content to provide in association with the portion of the digital item based, at least in part, on the level of reproducing the supplemental content. At 610, the process 600 includes providing the portions of the supplemental content in conjunction with the portion of the digital item. In particular instances, the client device may receive additional input indicating further actuation of the particular physical input device. The additional input may specify a different level of reproducing the supplemental content and the client device may modify the portions of the supplemental content reproduced in conjunction with the portion of the electronic book based, at least in part, on the different level of reproducing the supplemental content.

Figure 7:
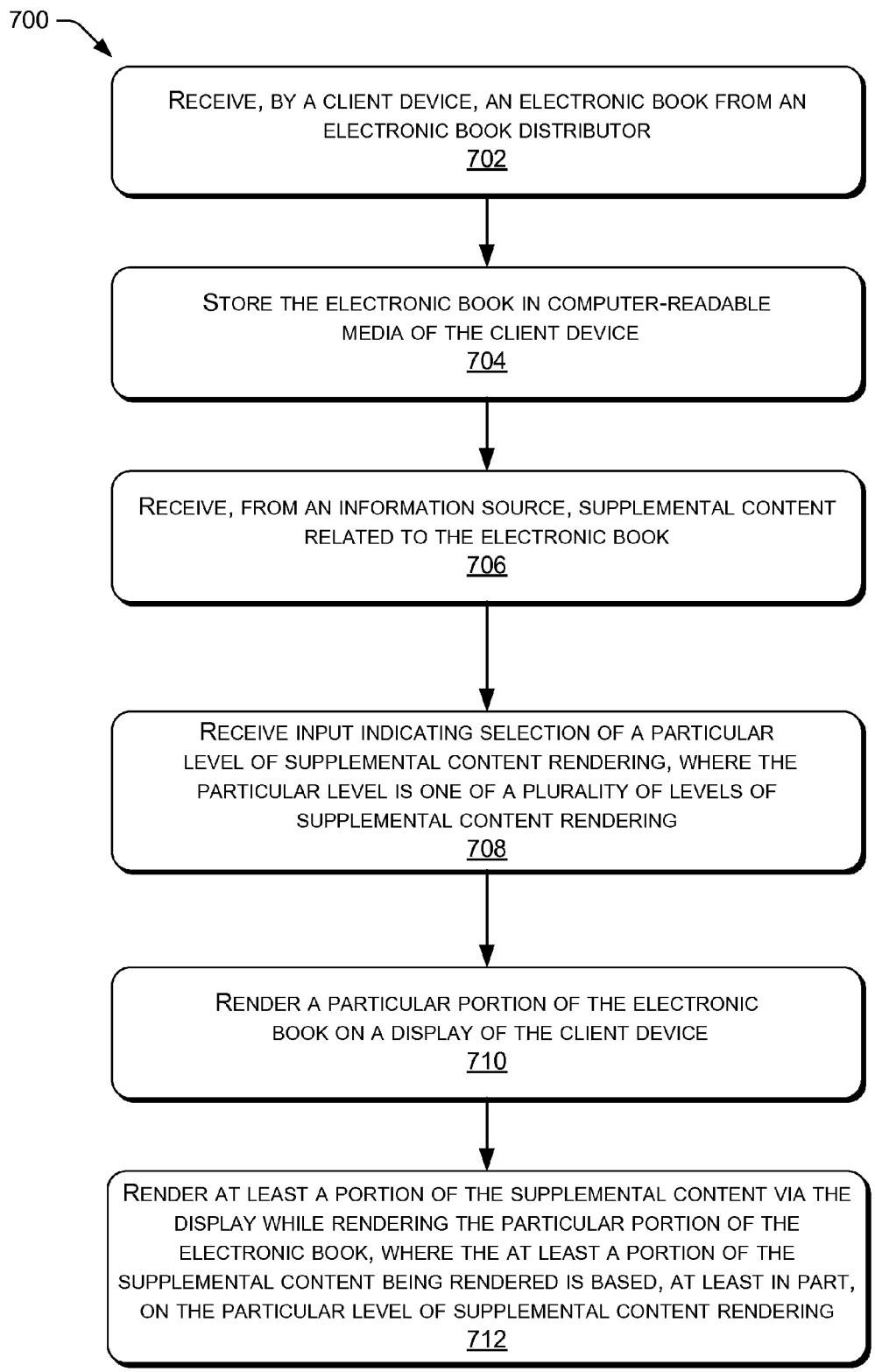
FIG. 7 is a flow diagram of a process to provide supplemental electronic book content in association with a particular number of categories of supplemental content, an amount of supplemental content from at least a portion of the number of categories, or both, according to a particular supplemental content rendering level.

FIG. 7 is a flow diagram of a process 700 to provide supplemental electronic book content in association with a particular number of categories of supplemental content, an amount of supplemental content from at least a portion of the number of categories, or both, according to a particular supplemental content rendering level. At 702, the process 700 includes receiving, by a client device, an electronic book from an electronic book distributor and, at 704, the process 700 includes storing the electronic book in computer-readable media of the client device.

At 706, the process 700 includes receiving supplemental content related to the electronic book from an information source. In addition, at 708, the process 700 includes receiving input indicating selection of a particular level of supplemental content rendering. The particular level may be one of a plurality of levels of supplemental content rendering, and each level of supplemental content rendering may specify one or more categories of supplemental content from which to render supplemental content on a display of the client device, an amount of the supplemental content from at least a portion of the number of categories, to render on a display of the client device, or both.

In some cases, the information source may provide annotations to the client device related to the electronic book and the particular level of supplemental content rendering may indicate a number of annotations to render in association with the particular portion of the electronic book. In particular implementations, the particular level of supplemental content rendering may indicate a threshold rating of annotations to render in association with the particular portion of the electronic book.

In other instances, the information source may be a social networking site and the supplemental content to render on the display includes information provided by individuals having a specified relationship with a user of the client device. In certain scenarios, the individuals having the specified relationship with the user may be included in a list maintained by the social networking site. In an illustrative example, the list may include contacts of the user. In particular situations, the individuals having the specified relationship with the user may be may be related to the user within one or more degrees of separation. To illustrate, the client device may provide social networking information associated with friends of the user, friends of friends of the user, and so on.

At 710, the process 700 includes rendering a particular portion of the electronic book on a display of the client device and, at 712, the process 700 includes rendering at least a portion of the supplemental content on the display while rendering the particular portion of the electronic book. The portion of the supplemental content may correspond to the particular portion of the electronic book.

In certain implementations, the client device may receive additional supplemental content related to the electronic book from an additional information source and the particular level of supplemental content rendering may specify particular supplemental content and particular additional supplemental content to render on the display. In a particular implementation, the client device may receive the additional supplemental content from a plurality of media outlet sources and the particular level of supplemental content rendering may specify rendering information received from a particular number of the media outlet sources, such as favorite media outlet sources of a user of the client device or media outlet sources providing information associated with locations that are a specified distance from the client device. In certain implementations, the media outlet sources may provide news information to individuals.

Figure 8:
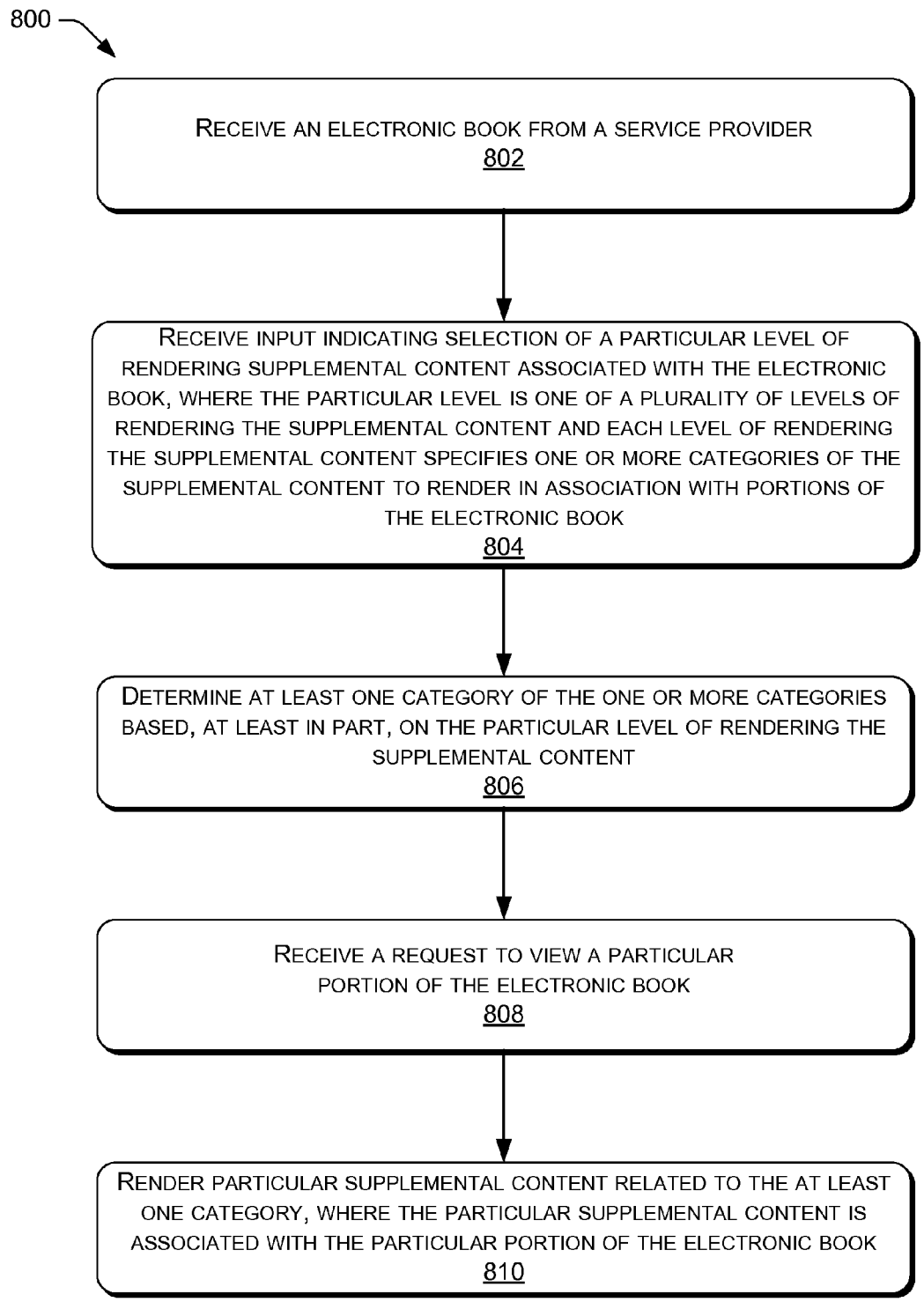
FIG. 8 is a flow diagram of a process to provide a particular amount of supplemental electronic book content for each of a number of categories of supplemental content according to a supplemental content rendering level.

FIG. 8 is a flow diagram of a process 800 to provide a particular amount of supplemental electronic book content for each of a number of categories of supplemental content according to a supplemental content rendering level. At 802, the process 800 includes receiving an electronic book from a service provider at a client device. At 804, the process 800 includes receiving input indicating selection of a particular level of rendering supplemental content associated with the electronic book. The particular level may be one of a plurality of levels of rendering the supplemental content and each level of rendering the supplemental content may specify one or more categories of the supplemental content to render in association with portions of the electronic book. In certain instances, the client device may render an input device on a portion of a touch sensitive display of the client device and the input may be received in response to activation of the input device rendered on the portion of the touch sensitive display. In particular implementations, the client device may send a request to the service provider to provide supplemental content from the at least one category of supplemental content at least partly in response to receiving the input indicating selection of the particular level of rendering the supplemental content. In these implementations, the client device may obtain at least a portion of the supplemental content related to the particular level of supplemental content rendering from the service provider, although, other portions of the supplemental content may be received from other sources.

At 806, the process 800 includes determining at least one category of the one or more categories based, at least in part, on the particular level of rendering the supplemental content. The at least one category may be associated with the particular level of rendering the supplemental content based, at least in part, on preferences of a user of the client device, an amount of supplemental content related to the at least one category that is accessed by the user of the client device, an amount of time that supplemental content related to the at least one category is rendered on a display of the client device, or combinations thereof. At 808, the process 800 includes receiving a request to view a particular portion of the electronic book and, at 810, the process 800 includes rendering particular supplemental content related to the at least one category. The particular supplemental content may be associated with the particular portion of the electronic book.

Figure 9:
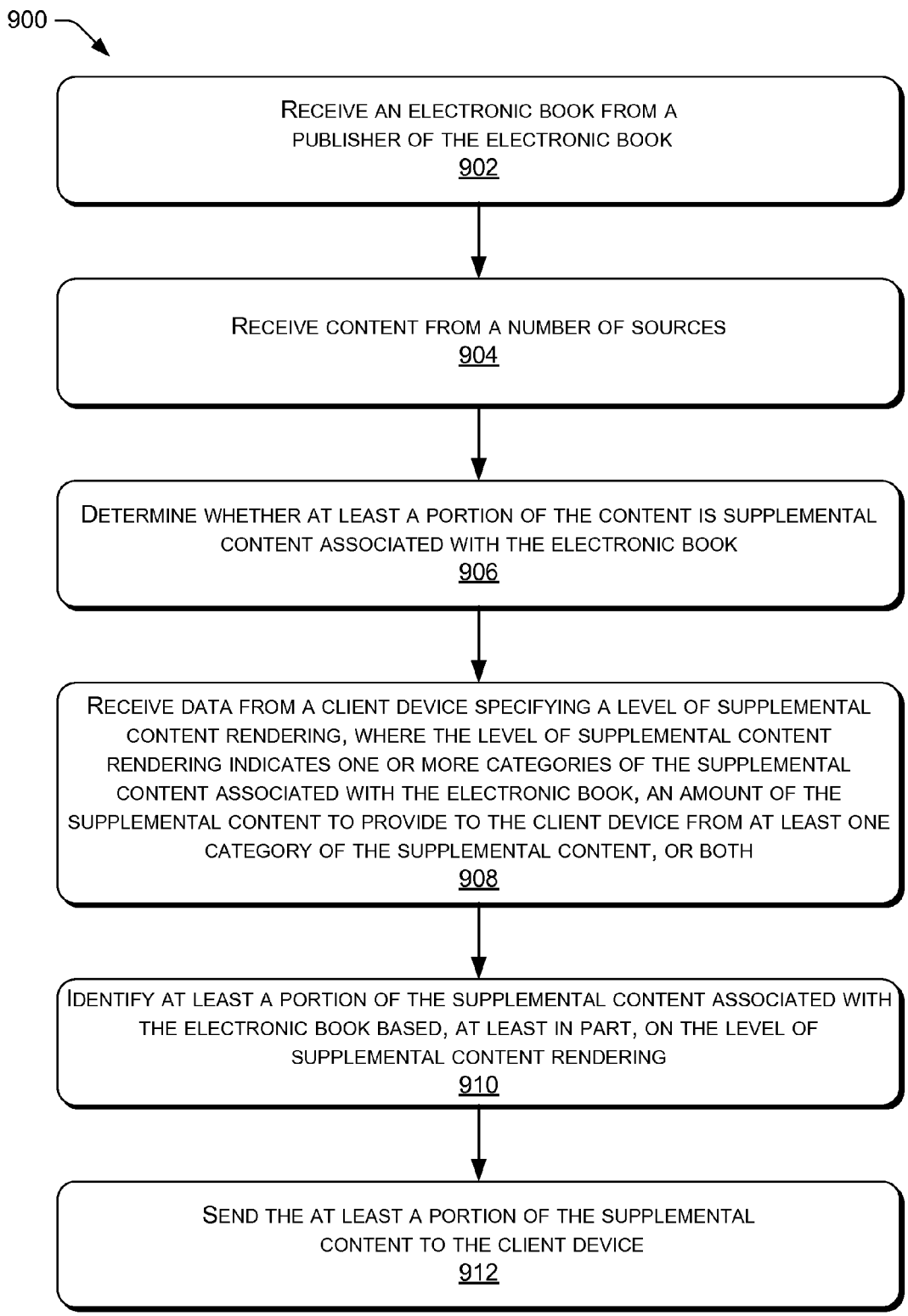
FIG. 9 is a flow diagram of a process for a service provider to receive information indicating a supplemental content rendering level associated with a client device and to provide supplemental electronic book content to the client device according to the supplemental content rendering level.

FIG. 9 is a flow diagram of a process 900 for a service provider to receive information indicating a supplemental content rendering level associated with a client device and to provide supplemental electronic book content to the client device according to a supplemental content rendering level. At 902, the process 900 includes receiving an electronic book from a publisher of the electronic book and, at 904, the process 900 includes receiving content from a number of sources.

At 906, the process 900 includes determining whether at least a portion of the content is supplemental content associated with the electronic book. At 908, the process 900 includes receiving data from a client device specifying a level of supplemental content rendering. The level of supplemental content rendering may indicate one or more categories of the supplemental content associated with the electronic book, an amount of the supplemental content to provide to the client device from at least one category of the supplemental content, or both.

At 908, the process 900 includes identifying at least a portion of the supplemental content associated with the electronic book based, at least in part, on the level of supplemental content rendering. At 910, the process 900 includes sending the at least a portion of the supplemental content to the client device. In some cases, the service provider may receive data from the client device indicating a portion of the electronic book being rendered via the client device and the portion of the supplemental content being sent to the client device may be associated with the portion of the electronic book being rendered via the client device.

Further, the service provider may receive additional data from the client device indicating an additional level of supplemental content rendering. In some cases, the service provider may send further supplemental content to the client device from at least one additional category of supplemental content at least partly in response to receiving the additional data, while in other situations, the service provider may send a greater amount of supplemental content from the at least one category to the client device at least partly in response to receiving the additional data.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
under control of one or more computing systems configured with specific executable instructions,
receiving, by a client device, an electronic book from an electronic book distributor;
storing the electronic book in computer-readable media of the client device;
receiving, from an information source, supplemental content related to the electronic book;
receiving input indicating selection of a particular level of supplemental content rendering, the particular level being one of a plurality of consecutive levels of supplemental content rendering, each level of the plurality of consecutive levels specifying an amount of supplemental content to be rendered;
rendering a particular portion of the electronic book on a display of the client device;
rendering at least a portion of the supplemental content on the display while rendering the particular portion of the electronic book, such that the at least a portion of the supplemental content being rendered is based, at least in part, on the particular level of supplemental content rendering, and wherein the particular level is configured to be maintained while rendering a plurality of pages of the electronic book; and modifying the particular level of supplemental content rendering while rendering the particular portion of the electronic book.

2. The computer-implemented method as recited in claim 1, further comprising:

identifying the particular portion of the electronic book;

determining an association between the particular portion of the electronic book and the at least a portion of the supplemental content; and selecting the at least a portion of the supplemental content for rendering based at least in part on the determined association.

3. The computer-implemented method as recited in claim 1, wherein the supplemental content is first supplemental content from a first category of supplemental content and the computer-implemented method further comprises receiving second supplemental content related to the electronic book from an additional information source, wherein the second supplemental content is from a second category of supplemental content different from the first category of supplemental content, the particular level of supplemental content rendering specifying an amount of particular first supplemental content and an amount of particular second supplemental content to render on the display.

4. The computer-implemented method as recited in claim 1, wherein the information source is a social networking site and the supplemental content to render on the display includes information provided by individuals having a specified relationship with a user of the client device.

5. The computer-implemented method as recited in claim 4, wherein the individuals having the specified relationship with the user are included in a list maintained by the social networking site.

6. The computer-implemented method as recited in claim 1, wherein the information source provides annotations related to the electronic book to the client device.

7. The computer-implemented method as recited in claim 6, wherein the particular level of supplemental content rendering indicates a number of annotations to render in association with the particular portion of the electronic book.

8. The computer-implemented method as recited in claim 6, wherein:

one or more of the annotations have a respective rating;

the particular level of supplemental content rendering indicates a threshold rating of annotations; and the one or more annotations having a respective rating above the threshold rating of annotations are rendered.

9. The computer-implemented method as recited in claim 1, wherein the at least a portion of the supplemental content is rendered without receiving input indicating selection of text of the particular portion of the electronic book.

10. The computer-implemented method as recited in claim 1, wherein the input comprises a first input and the at least a portion of the supplemental content comprises a first portion of the supplemental content, the method further comprising:

receiving a second input indicating selection of a second level of supplemental content rendering, wherein the second level is different from the first level; and rendering, at least partially in response to the second input, a second portion of the supplemental content on the display while rendering the particular portion of the electronic book.

11. The computer implemented method as recited in claim 10, wherein:

the second portion of the supplemental content includes the first portion of the supplemental content and one or more additional portions of the supplemental content, and the second level of supplemental content rendering specifies the first and second categories.

12. The computer implemented method as recited in claim 1, wherein the at least a portion of the supplemental content comprises a first portion of the supplemental content, the method further comprising:

rendering, at least partially in response to the modifying, a second portion of the supplemental content, the second portion of the supplemental content being different from the first portion of the supplemental content.

13. The computer implemented method as recited in claim 1, further comprising selecting the particular level of supplemental content rendering based on the electronic book.

14. A client device comprising:

one or more output devices;

one or more physical input devices;

one or more processors;

computer-readable media accessible by the one or more processors, the computer-readable media storing:

a digital item;

supplemental content related to the digital item; and a digital item content system executable by the one or more processors to:

provide a portion of the digital item via at least one output device of the one or more output devices;

determine particular portions of the supplemental content related to the portion of the digital item;

receive input indicating actuation of a particular physical input device of the one or more physical input devices, the input specifying a first level of reproducing the supplemental content;

identify portions of the supplemental content to provide in association with the portion of the digital item based, at least in part, on the first level of reproducing the supplemental content;

provide the portions of the supplemental content in conjunction with the portion of the digital item, wherein the first level of reproducing the supplemental content is configured to be maintained while rendering a plurality of pages of the digital item;

receive a further input indicating actuation of the physical input device; and modify, in response to the further input, the level of reproducing the supplemental content provided via the at least one output device while providing the portion of the digital item.

15. The client device as recited in claim 14, wherein the level of reproducing the supplemental content is one of a plurality of levels and each level corresponds to reproducing a specified amount of the supplemental content.

16. The client device as recited in claim 15, wherein a first level of reproducing supplemental content is associated with a first portion of the supplemental content and a second level of reproducing supplemental content is associated with a second portion of the supplemental content, the second portion of the supplemental content including the first portion of the supplemental content and one or more additional portions of supplemental content.

17. The client device as recited in claim 16, wherein the digital item is associated with the first level of reproducing the supplemental content and an additional digital item stored by the computer-readable media is associated with the second level of reproducing the supplemental content.

18. The client device as recited in claim 14, wherein the supplemental content is received from a plurality of sources and the level of reproducing the supplemental content corresponds to identifying portions of the supplemental content received from one or more particular sources of the plurality of sources.

19. The client device as recited in claim 14, wherein the further input is indicative of a different level of reproducing the supplemental content, wherein the digital item content system is further executable by the processor to modify the portion of the supplemental content provided in conjunction with the portion of the digital item based, at least in part, on the different level of reproducing the supplemental content.

20. A non-transitory computer-readable storage media storing computer-readable instructions that, when executed, instruct a processor to perform operations comprising:
receiving an electronic book from a service provider;
receiving input indicating selection of a particular level of rendering supplemental content associated with the electronic book, the particular level being a first level of a plurality of consecutive levels of rendering the supplemental content, and each level of rendering the supplemental content specifying one or more categories of the supplemental content to render in association with portions of the electronic book and an amount of the supplemental content to render from the specified one or more categories;
determining at least one category of the one or more categories based, at least in part, on the particular level of rendering the supplemental content;
receiving a request to view a particular portion of the electronic book;
rendering, in response to the input, a first amount of supplemental content related to the at least one category and specified by the first level of rendering the supplemental content, the first level of rendering being configured to be maintained while rendering a plurality of pages of the electronic book;
rendering the particular portion of the electronic book;
receiving a further input indicating selection of a second level of reproducing supplemental content; and
rendering, in response to the further input, a second amount of supplemental content specified by the second level while rendering the particular portion of the electronic book.

21. The non-transitory computer-readable storage media as recited in claim 20, wherein the operations further comprise sending a request to the service provider to provide supplemental content from the at least one category at least partly in response to receiving the input indicating selection of the particular level of rendering the supplemental content.

22. The non-transitory computer-readable storage media as recited in claim 20, wherein the at least one category is associated with the particular level of rendering the supplemental content based, at least in part, on preferences of a user of the client device, an amount of supplemental content related to the at least one category that is accessed by the user of the client device, an amount of time that supplemental content related to the at least one category is rendered on a display of the client device, or combinations thereof.

23. The non-transitory computer-readable storage media as recited in claim 20, wherein the operations further comprise rendering an input device on a portion of a touch sensitive display of the client device and the input is received in response to activation of the input device rendered on the portion of the touch sensitive display.

24. A computer-implemented method, comprising:
under control of one or more computing systems configured with specific executable instructions,
receiving an electronic book from a publisher of the electronic book;
receiving content from a number of sources;
determining whether at least a portion of the content is supplemental content associated with the electronic book;
receiving data from a client device specifying a first level of supplemental content rendering, the first level of supplemental content rendering being one of a plurality of consecutive levels of supplemental content rendering, the first level indicating one or more categories of the supplemental content associated with the electronic book, and a first amount of the supplemental content to provide to the client device from at least one category of the supplemental content;
identifying at least a portion of the supplemental content associated with the electronic book based, at least in part, on the first level of supplemental content rendering;
sending the at least a portion of the supplemental content to the client device;
rendering a portion of the electronic book on the client device, wherein the first level of supplemental content rendering is configured to be maintained while rendering a plurality of pages of the electronic book;
receiving further data from the client device specifying second level of supplemental content consecutive to the first level; and
rendering, in response to the further data, a second amount of supplemental content corresponding to the second level while rendering the portion of the electronic book.

25. The computer-implemented method as recited in claim 24, further comprising receiving data from the client device indicating the portion of the electronic book being rendered on the client device.

26. The computer-implemented method as recited in claim 25, further comprising:
identifying the portion of the electronic book;
determining an association between the portion of the electronic book and the at least a portion of the supplemental content; and
selecting the at least a portion of the supplemental content for rendering based at least in part on the determined association.

27. The computer-implemented method as recited in claim 24, further comprising sending additional supplemental content to the client device from at least one additional category of supplemental content at least partly in response to receiving the further data.

* * * * *